United States Patent [19]

Kudla et al.

[11] Patent Number: 4,823,035

[45] Date of Patent: Apr. 18, 1989

[54] ELECTRIC MOTOR WITH LOCKING APPARATUS

[75] Inventors: David P. Kudla, Dayton; Susan E. Holbrook, Vandalia, both of Ohio

[73] Assignee: General Motors Corporation, Detroit, Mich.

[21] Appl. No.: 162,030

[22] Filed: Feb. 29, 1988

[51] Int. Cl.⁴ .................... H02K 7/106; G05G 5/06; F03G 7/06

[52] U.S. Cl. .................... 310/68 C; 60/528; 188/79.52

[58] Field of Search ............ 60/527, 528; 188/69, 188/79.52; 310/68 C, 77, 100, 117, 121; 361/211; 417/462

[56] References Cited

U.S. PATENT DOCUMENTS

| | | | |
|---|---|---|---|
| 4,400,995 | 8/1983 | Palm | 188/69 |
| 4,434,618 | 3/1984 | Dillon | 60/528 |
| 4,524,343 | 6/1985 | Morgan et al. | 60/527 |
| 4,559,512 | 12/1985 | Yaeger et al. | 60/527 |

Primary Examiner—Patrick R. Salce
Assistant Examiner—D. L. Rebsch
Attorney, Agent, or Firm—Robert M. Sigler

[57] ABSTRACT

An electric motor inlcudes a slotted collar on the rotor and a temperature sensitive actuator with an attached pin effective when cold to move into an inserted position in which the pin engages the slotted collar to prevent rotor rotation, and when hot to move to a retracted position in which the pin is withdrawn from the collar to allow rotor rotation. The actuator comprises first and second springs having ends connected together and exerting opposing forces on each other, the second spring being made of a temperature sensitive memory metal so as to shorten and lengthen the actuator with changing temperature. The acutator is electrically conducting and inserted in series with the motor commutator, whereby armature current heats the actuator to move to the retracted position, and cessation of armature current allows it to cool and move to its inserted position.

2 Claims, 1 Drawing Sheet

ELECTRIC MOTOR WITH LOCKING APPARATUS

BACKGROUND OF THE INVENTION

This invention relates to an electric motor including apparatus effective to lock the rotor against rotation when the motor is not in use.

At present, motors designed for reversible operation under electric power can further be designed to resist reversing by external torque when electrical operation ceases, but only with a loss in overall operating efficiency. With an additional locking apparatus, however, such a motor can be designed for maximum efficiency in reversible operation and still resist rotation of the rotor by external forces when motor operation ceases. Such locking apparatus should lock and unlock the motor automatically with motor use.

SUMMARY OF THE INVENTION

The electric motor of the invention comprises a stator and a rotor rotatably supported therein, commutator means for communicating armature current between the stator and the rotor and locking apparatus. The locking apparatus comprises a slotted collar on the rotor comprising circumferentially spaced slots and a pin adapted for reciprocal movement between an inserted position in which a free end of the pin is engaged within one of the slots to prevent rotation of the rotor, and a retracted position in which the free end of the pin is pulled out of engagement with the one of the slots to allow rotation of the rotor. The locking apparatus further comprises a temperature sensitive actuator comprising first and second springs having ends connected together, said first and second springs exerting opposing forces, one in compression and the other in tension. The second spring is made of a temperature sensitive memory metal and is effective at temperatures below a predetermined temperature to allow the first spring to move the pin into its inserted position and at temperatures above the predetermined temperature to move the pin against the first spring to its retracted position. The temperature sensitive actuator is electrically conductive and connected in series with the commutator means to carry the motor armature current and be heated thereby, whereby the pin is automatically placed in its retracted position to allow rotor rotation when armature current is provided to the motor, and is automatically placed in its inserted position when armature current is stopped to lock the rotor against rotation.

Further details and advantages of the invention will be apparent in the accompanying drawings and following description of a preferred embodiment.

DESCRIPTION OF THE PREFERRED EMBODIMENT

Figure 1:
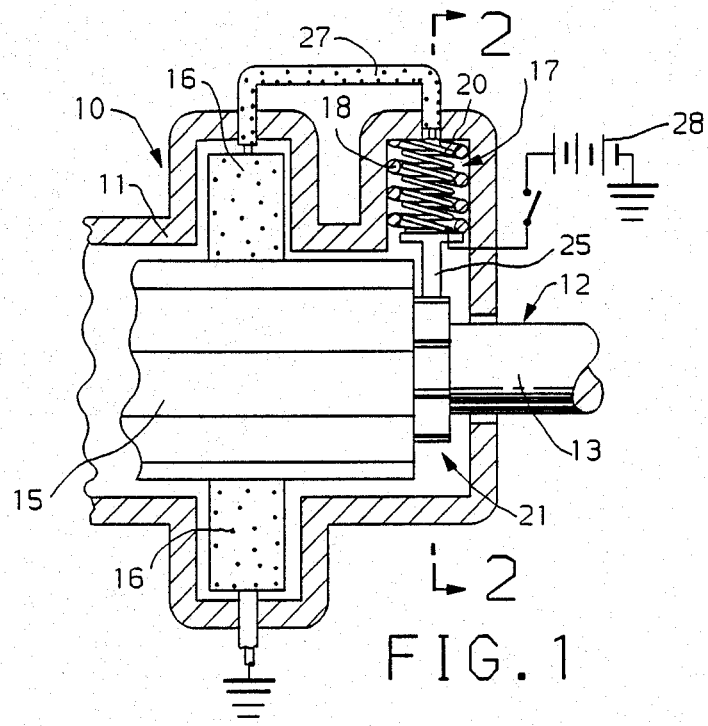
FIG. 1 is a cutaway view of a portion of a motor according to the invention.

Referring to FIG. 1, an electric motor 10 has a stator 11 rotatably supporting a rotor 12 on a shaft 13. The stator 11 and rotor 12 may be a conventional permanent magnet stator, wound armature motor except as described herein. Rotor 12 further includes commutator bars 15; while stator 11 supports brushes 16 held in a standard brush support and urged radially inward in the standard manner against commutator bars 15 by springs, not shown, to form a commutator for motor 10. The conventional armature windings, not shown, of motor 10 on rotor 12 are connected to commutator bars 15 to receive the armature current.

A temperature sensitive actuator 17 comprises a first coil spring 18 made of standard spring steel to be electrically conductive and a second coil spring 20 made of a shape memory metal and also electrically conductive. The springs are coaxially arranged with the smaller diameter spring 20 inside larger diameter spring 18 and are physically and electrically connected together at each axial end with spring 18 in compression and spring 20 in tension.

Spring 20, as previously mentioned, is made of a shape memory alloy such as Nitinol (R) or its equivalent. Such alloys have the property that a member made therefrom undergoes a phase change at a predetermined temperature between a martensitic (cold) phase and an austenitic (hot) phase. The member may be manufactured with a particular "memorized" austenitic shape to which it returns when heated, but an alternative martensitic shape to which it may be reformed when cold. When heated to the phase change temperature, the member will quickly snap to its austenitic shape while exerting a comparatively large force, while so doing, against any other member resisting the change. When cooled below the phase change temperature, the member is easily moved back into its martensitic shape by a smaller external force and will maintain that shape while cold. Shape memory spring 20 is made so as to be axially extended in its cold, martensitic phase and axially retracted in its hot, austenitic phase. Spring 18 is designed with a force characteristic consistent with this shape change. That is, spring 18 is overcome by the greater force of spring 20 retracting to its austenitic shape when hot, but overcomes the weaker resistance of spring 20 in its cooler, martensitic phase to axially extend the springs. Thus, the springs form a temperature sensitive actuator which axially lengthens when cold and axially retracts when hot.

Figure 2:
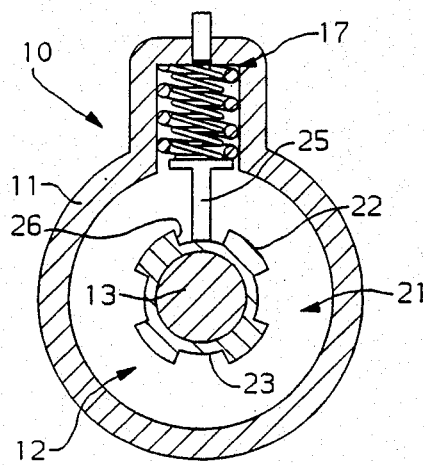
FIG. 2 is a section view along lines 2—2 of FIG. 1 showing the locking apparatus in a locked position.
Figure 3:
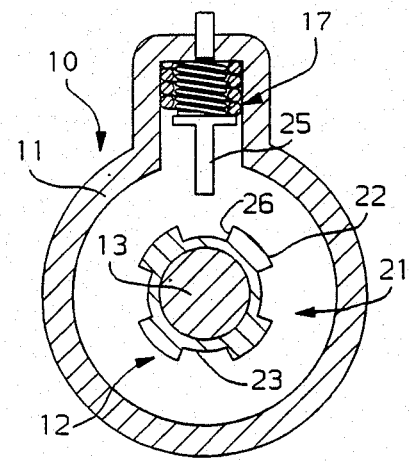
FIG. 3 is a view similar to that of FIG. 2 showing the locking apparatus in an unlocked position.

One end of actuator 17 is anchored to stator 11, with the other end thereof directed radially inward toward a slotted collar 21 carried on rotor 12 adjacent commutator bars 15. Collar 21 has alternating lands 22 having a larger diameter and slots 23 having a smaller diameter. A pin 25 is attached to the free end of actuator 17 to be moved thereby between a retracted position as shown in FIG. 2, in which the pin is retracted radially from slot 23 to allow rotation of rotor 12, and an inserted position as shown in FIG. 3, in which the pin is radially inserted into slot 23 to prevent the rotation of rotor 12 as the radial sides 26 of lands 22 engage pin 25.

Actuator 17, as previously mentioned, is electrically conductive. One end of actuator 17 is connected by a conducting wire 27 to one of the brushes 16, with the other of the brushes 16 grounded as shown in FIG. 1. The other end of actuator 17 is connected to the positive voltage side of an electric dc power source 28 through a switch 30. The other side of power source 28 is grounded. The actuator is thus connected in series with the motor commutator and electric power source to carry full armature current when switch 30 is closed to begin motor operation. Armature 17 is designed with a resistance causing electric heating thereof, resulting in the raising of the temperature of the actuator above its phase change temperature a few milliseconds after armature current starts flowing. This causes shape memory spring 20 to change phase to its austenitic form so that actuator 17 withdraws pin 25 from its inserted position as shown in FIG. 3 to its retracted position as shown in FIG. 2, to permit rotation of rotor 12 and operation of the motor. After switch 30 is opened and armature current stops flowing, actuator 17 will cool so that shape memory spring 20 can return to its martensitic phase and allow compression spring 18 to return pin 25 to its inserted position, in which it prevents rotation of rotor 12. The pin will remain engaged with slotted collar 21 until switch 30 is once again closed to provide motor armature current through actuator 17 and the armature windings of motor 10.

The embodiments of the invention in which an exclusive property or privilege is claimed are defined as follows:

1. An electric motor comprising a stator and a rotor rotatably supported therein, the motor further comprising commutator means for communicating armature current between the stator and the rotor and locking apparatus comprising, in combination:

a slotted collar on the rotor comprising circumferentially spaced slots;

a pin adapted for reciprocal movement between an inserted position in which a free end of the pin is engaged within one of the slots to prevent rotation of the rotor and a retracted position in which the free end of the pin is pulled out of engagement with the one of the slots to allow rotation of the rotor;

a temperature sensitive actuator comprising first and second springs having ends connected together, said first and second springs exerting opposing forces, one in compression and the other in tension, the second spring being made of a temperature sensitive memory metal and effective at temperatures below a predetermined temperature to allow the first spring to move the pin into its inserted position and at temperatures above the predetermined temperature to move the pin against the first spring to its retracted position, the temperature sensitive actuator being electrically conductive and connected in series with the commutator means to carry the motor armature current and be heated thereby so that the pin is automatically placed in its retracted position to allow rotor rotation when armature current is provided to the motor and is automatically placed in its inserted position when armature current is stopped to lock the rotor against rotation.

2. The motor of claim 1 in which the first and second springs are coaxially arranged coil springs joined at their axial ends with the first spring in compression and the second spring in tension, the second spring shortening its axial length above the predetermined temperature to give the temperature sensitive actuator a short axial length and lengthening its axial length below the predetermined temperature to give the actuator a long axial length.

* * * * *